Figure 1:
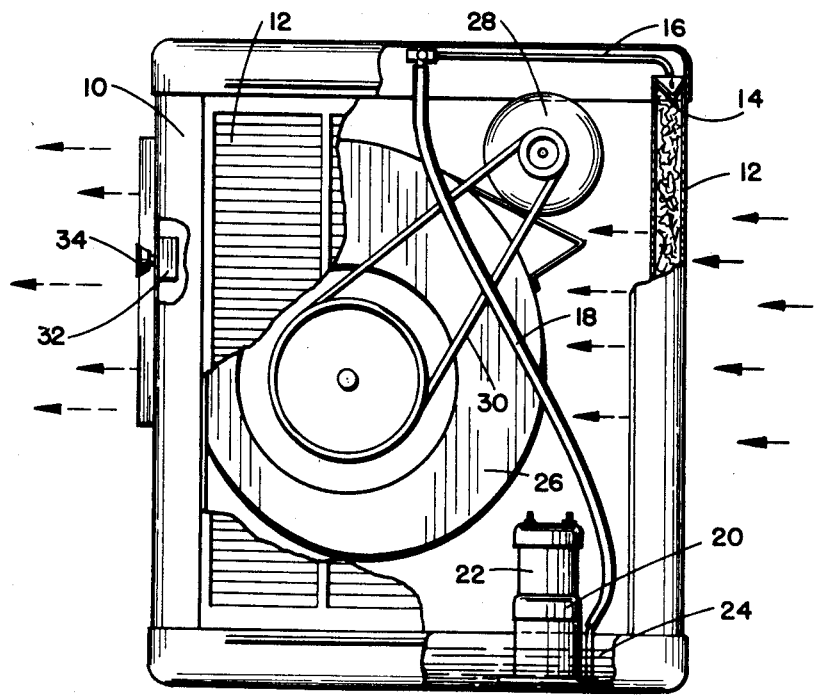

June 7, 1960     A. D. GOETTL     2,939,687

EVAPORATIVE COOLER AND CONTROL MEANS

Filed June 19, 1957

INVENTOR.
ADAM D. GOETTL
BY Wm. H. Dean
AGENT

United States Patent Office 2,939,687
Patented June 7, 1960

2,939,687

EVAPORATIVE COOLER AND CONTROL MEANS

Adam D. Goettl, Phoenix, Ariz., assignor to McGraw-Edison Company, Elgin, Ill., a corporation of Delaware Filed June 19, 1957, Ser. No. 666,529

10 Claims. (Cl. 261—26)

This invention relates to an evaporative cooler and control means and more particularly to a control means which, during starting operation of an evaporative cooler, automatically causes the pads of the cooler to be thoroughly soaked before the blower motor is energized.

Evaporative coolers are generally operated by a switch which energizes the blower motor of an evaporative cooler and concurrently starts a pump which delivers water to the pads of the cooler. Such an arrangement permits the blower to force a considerable amount of air through the pads before they are thoroughly soaked. Under these conditions the air initially passing through the pads may remove dust therefrom and conduct this dust into a building to which the evaporative cooler is disposed to deliver cool air. A similar situation exists in other types of evaporative coolers having a switch for starting the blower and a valve which admits water to the evaporative cooler pads. Usually these evaporative coolers have separate controls; one for the blower motor and the other for a water valve. Such an arrangement is usually operated by concurrently opening the water valve and turning on the blower motor. This mode of operation also causes air to flow through the pads of the cooler before the water has time to thoroughly soak them. Thus, dust is forced through the pads and into a room into which the cooler is disposed to deliver cool air.

Accordingly, it is an object of the present invention to provide an evaporative cooler and control means wherein a single control switch may be actuated to cause the pads of the cooler to become thoroughly saturated before the blower motor is automatically energized whereby all dust in the pads is soaked down before air is forced therethrough; thus the dust is not entrained in the air and the air is clean and cool as it flows into a building to which the evaporative cooler is disposed to deliver the air.

Another object of the invention is to provide a control means for evaporative coolers wherein a thermally actuated switch is responsive to a temperature rise of a liquid pump motor and closes a circuit to energize the fan motor after the pump has been running a considerable length of time and delivering water to the pads so that they are thoroughly soaked before the blower motor is energized.

Another object of the invention is to provide a very simple control means for evaporative coolers wherein a thermally operated switch, in circuit with a blower motor, is responsive to a predetermined temperature rise within the pump motor which delivers liquid to the pads of the cooler whereby, the temperature rise in the pump motor takes a sufficient amount of time to permit the pump to thoroughly soak the pads of the cooler before the blower motor is energized through said switch.

Another object of the invention is to provide a control means for evaporative coolers having a very simple circuit arrangement.

Another object of the invention is to provide a control means for evaporative coolers utilizing a single manual control which assures the pads being thoroughly saturated whereupon a blower is automatically energized to force air through evaporative cooler pads.

Another object of the invention is to provide a novel control circuit for evaporative coolers wherein a pump motor heats a thermally responsive switch which controls a relay in circuit with a blower motor; said switch functioning to prevent operation of the blower motor for a predetermined period of time after the pump motor is started; said relay normally closed and completing a circuit to said blower motor when the circuit to the pump is deenergized, whereby a common simple circuit may be used as a time delay device and may also be used for individual operation of the blower for ventilation purposes.

Figure 2:
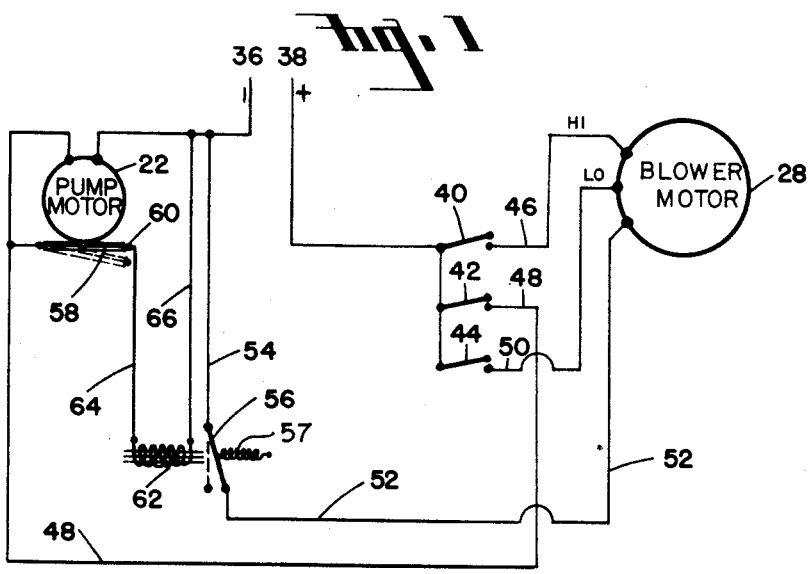

Further objects and advantages of the invention may be apparent from the following specification, appended claims and accompanying drawings in which:

Fig. 1 is a side elevational view of an evaporative cooler showing portions thereof broken away and in section to amplify the illustration; and Fig. 2 is a diagrammatic view of the electrical wiring and control means of the present invention.

An evaporative cooler, as shown in Fig. 1 of the drawings, is provided with a housing 10 having evaporative cooler pads 12 in its side walls. These pads 12 are each provided with a water receiving trough 14 at its upper edge. These troughs receive water from a manifold 16 which is supplied via a hose 18 by a pump 20 driven by a pump motor 22. The pump 20 is immersed in a sump 24 at the bottom of the evaporative cooler and receives water drained by gravitation through the pads 12.

A blower 26 in the housing 10 forces air through the pads 12 and a blower motor 28 drives the blower by means of a belt 30.

A switch 32 having a control knob 34 is arranged in circuit with the pump motor 22 and the blower motor 28, as shown in Fig. 2 of the drawings. Referring to Fig. 2 of the drawings it will be seen that conductors 36 and 38 are coupled to a power supply suitable for opeartion of the motors 22 and 28. The conductor 38 is electrically connected with three switches 40, 42, and 44 which are arranged to couple the conductor 38 with the conductors 46, 48, and 50, respectively. The conductors 46 and 50 are connected with the blower motor 28 and serve to energize windings in the motor 28 which cause it to operate at high and low speeds, respectively. A conductor 52 is also coupled to the motor 28 and this conductor 52 is normally coupled to another conductor 54 by means of a spring loaded relay switch 56. The conductor 54 is coupled to the conductor 36. The conductor 48 is coupled to one terminal of the pump while the other terminal of the pump motor is coupled to the conductor 36. Coupled to the conductor 48 is a thermostatic bimetal member 58 which is arranged to respond to the temperature of the pump motor 22. This member 58 when heated by the pump motor 22 is arranged to open a switch 60 coupled to a relay 62 by means of a conductor 64. The relay 62 by means of a conductor 66 is coupled to the conductor 36 and this relay 62 when energized is arranged to open its normally closed switch 56 and disconnect the conductors 52 and 54 to thereby deenergize a circuit to the blower motor 28.

The switch 32, as shown in Fig. 1 of the drawing, includes all of the switches 40, 42, and 44. The construction of the switch 32 is no part of my present invention, however, this switch 32 is a conventional switch operable by the control knob 34 and is arranged to selectively and concurrently close switches 40 and 42 or 42 and 44 or this switch may be operable to close the switches 40 or 44 individually.

The operation of the evaporative cooler and control means therefore in accordance with the present invention is substantially as follows.

When the control knob 34 is actuated to a desired position to close the switches 40 and 42 or switches 42 and 44 concurrently, the blower motor 28 is coupled to the conductor 38 via the conductor 46. The switch 56 is held open by the electromagnet of the relay 62 which is energized through the switch 42, conductor 48, thermostatic member 58, switch 60, and conductors 64 and 66. The blower motor 28 is thus inoperative, however, closing of the switch 42 connects the conductor 38 with the conductor 48 and causes energization of the pump motor 22 by completing a circuit through the conductor 36.

The pump motor 22 then operates the pump 20 and forces water upwardly to the troughs 14 which distribute the water over the upper portions of the evaporative cooler pads 12. As the pump motor 22 continues to operate the temperature therein gradually increases however, during a predetermined temperature rise of the pump 22 sufficient water is pumped to saturate the pads 12. When a predetermined temperature rise occurs in the pump motor 22 the bimetal thermostatic member 58 deflects and opens the switch 60 which deenergizes the relay 62. While one end of the winding of the relay 62 is connected to the conductor 36 the opposite end of the winding is connected to the conductor 64 and when the switch 60 is normally closed the bimetal thermostatic member 58 acts as a conductor coupled to the conductor 48 which normally completes a circuit to the conductor 38 through the closed switch 42. A predetermined temperature rise of the pump motor causes deflection of the thermostatic bimetal element 58 thereby de-energizing the relay 62 which permits the switch 56 thereof to close by force of the spring 57 and completes a circuit to the blower motor 28 via conductors 52, 54 and 36. Thus, the pump motor 22 operates a predetermined length of time or until a predetermined temperature rise therein has occurred. During this interim the pump delivers sufficient water to the evaporative cooler pads to thoroughly soak them before the switch 56 is closed and the blower 26 is started. After the pads have been thoroughly soaked all the dust and deleterious matter therein is wet and adhered to filaments of the pad whereby air forced therethrough by the blower 26 does not entrain the dust. The air which is diverted by the blower 26 to the interior of the building is cool and clean and without dust.

It will be understood that when the switch 42 is open that the solenoid 62 of the relay switch 56 cannot be energized. Thus, the switch 56 remains closed permitting the blower motor to be energized individually for high or low speed operation by closing the switch 40 or the switch 44, respectively. This arrangement provides for the operation of the blower as a ventilating device without evaporative cooling.

Various modifications of the present invention may be resorted to in a manner limited only by a just interpretation of the following claims.

I claim:

1. In an evaporative cooler and control means the combination of: evaporative cooler pad means; a pump for delivering water to the upper portion of said pad means; a pump motor for driving said pump; a blower disposed to force air through said pad means; a blower motor for driving said blower; first means to conduct electrical energy to said blower motor; and second means responsive to a temperature rise in said pump motor and disposed to initiate operation of said first means and thereby energize said blower motor.

2. In an evaporative cooler and control means the combination of: evaporative cooler pad means; a pump for delivering water to the upper portion of said pad means; a pump motor for driving said pump; a blower disposed to force air through said paid means; a blower motor for driving said blower; and a thermostatic switch responsive to a predetermined temperature rise within said pump and disposed to initiate operation of said blower motor.

3. In an evaporative cooler and control means the combination of: evaporative cooler pad means; a pump for delivering water to the upper portions of said pad means; a motor for driving said pump; a blower disposed to force air through said pad means; a motor for driving said blower; and means responsive to a predetermined temperature rise within said pump motor and disposed to initiate operation of said blower motor.

4. In an evaporative cooler and control means the combination of: evaporative pad means; a pump disposed to deliver water to an upper region of said pad means; a pump motor for operating said pump; a blower disposed to force air through said pad means; a blower motor for operating said blower; and means responsive to energization of said pump motor and disposed to complete a circuit to said blower motor after a predetermined operation of said pump motor.

5. In an evaporative cooler and control means the combination of: evaporative cooler pad means; a pump disposed to deliver water to an upper region of said pad means; a pump motor for operating said pump; a blower disposed to force air through said pad means; a blower motor for operating said blower; means to conduct electrical energy to said blower motor; and a thermostatic switch adjacent to said pump motor and responsive to a predetermined temperature rise of said pump motor; said thermostatic switch coupled to said last mentioned means to complete a circuit to said blower motor after a predetermined operation of said pump motor.

6. In an evaporative cooler and control means the combination of: evaporative cooler pad means; a pump disposed to deliver water to an upper region of said pad means; a pump motor for operating said pump; a blower disposed to force air through said pad means; a blower motor for operating said blower; means to conduct electrical energy to said blower motor; and a thermostatic switch adjacent said pump motor and responsive to a predetermined temperature rise of said pump motor; said thermostatic switch coupled to said last mentioned means to control completion of a circuit to said blower motor after a predetermined operation of said pump motor, said last mentioned means including a relay means coupled to said thermostatic switch and said blower motor whereby action of said thermostatic switch causes said relay to complete a circuit to said blower motor.

7. In an evaporative cooler and control means the combination of: evaporative cooler pad means; a pump disposed to deliver water to an upper region of said pad means; a pump motor for operating said pump; a blower disposed to force air through said pad means; a blower motor for operating said blower; means to conduct electrical energy to said blower motor; and a normally closed thermostatic switch adjacent said pump motor and responsive to a predetermined temperature rise of said pump motor; said thermostatic switch coupled to said last mentioned means to complete a circuit to said blower motor after a predetermined operation of said pump motor, said last mentioned means including a normally open relay switch coupled to said blower motor and operable by said thermostatic switch whereby opening action of said thermostatic switch deenergizes said relay switch and said relay switch completes a circuit to said blower motor.

8. In an evaporative cooler and control means the combination of: evaporative cooler pad means; a pump disposed to deliver water to an upper region of said pad means; a pump motor for operating said pump; a blower disposed to force air through said pad means; a blower motor for operating said blower; means to conduct electrical energy to said blower motor; and a normally closed thermostatic switch adjacent said pump motor and responsive to a predetermined temperature rise of said pump motor; said thermostatic switch coupled to said last mentioned means to complete a circuit to said blower motor after a predetermined operation of said pump motor, said last mentioned means including a normally closed relay switch coupled to said thermostatic switch and said blower motor whereby opening action of said thermostatic switch deenergizes said relay and said relay switch completes a circuit to said blower motor; and manually operable switch means having first and second switches in circuit with said pump motor and said blower motor for initiating operation thereof by closing circuits thereto.

9. In an evaporative cooler and control means the combination of: evaporative cooler pad means; a pump disposed to deliver water to an upper region of said pad means; a pump motor for operating said pump; a blower disposed to force air through said pad means; a blower motor for operating said blower; means to conduct electrical energy to said blower motor; and a normally closed thermostatic switch adjacent said pump motor and responsive to a predetermined temperature rise of said motor; said thermostatic switch coupled to said last mentioned means to complete a circuit to said blower motor after a certain predetermined operation of said pump motor, said last mentioned means including a normally closed relay coupled to said thermostatic switch and said blower motor whereby opening action of said thermostatic switch deenergizes said relay and said relay completes a circuit to said blower motor and manually operable switch means having first and second switches in circuit with said pump motor and said blower motor for operation thereof by closing circuits thereto, one element of said manually operable switch means disposed to energize said blower motor individually through said relay when it is deenergized.

10. In an evaporative cooler and control means the combination of: evaporative cooler pad means; a pump for delivering water to the upper portion of said pad means; an electrical pump motor for driving said pump; a blower disposed to force air through said pad means; a blower motor for driving said blower; an electrical circuit means comprising first and second conductors for delivering a supply of electrical energy to said motors; first switch means for coupling said first conductor to said pump and blower motors; said second conductor coupled directly to said pump motor; a normally closed relay operated switch coupling said blower motor to said second conductor; a relay coupled directly to one of said conductors and disposed when energized to open said relay operated switch; a normally closed thermostatic switch coupling said relay to the other of said conductors, said thermostatic switch responsive to the operating temperature of said pump motor and disposed to de-energize said relay when the temperature of said pump motor increases to a predetermined value thereby permitting said relay switch to assume a normally closed position relative to said second conductor and to energize said blower motor.

References Cited in the file of this patent
UNITED STATES PATENTS

| | | |
|---|---|---|
| 1,558,848 | Doble | Oct. 27, 1925 |
| 2,200,477 | Newton | May 14, 1940 |
| 2,239,595 | Cummings | Apr. 22, 1941 |
| 2,319,565 | Stratton | May 18, 1943 |
| 2,486,138 | Feinberg | Oct. 25, 1949 |
| 2,583,252 | Carraway | Jan. 22, 1952 |
| 2,642,227 | Ray | June 16, 1953 |
| 2,712,083 | Armstrong | June 28, 1955 |